UNITED STATES PATENT OFFICE 2,396,434

ACRYLIC ESTERS OF GLYCOL MONO-ETHERS

Chessie E. Rehberg, Glenside, and Charles H. Fisher, Abington, Pa., assignors to the United States of America, as represented by the Secretary of Agriculture No Drawing. Application July 19, 1944, Serial No. 545,653

3 Claims. (Cl. 260—486)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the acrylic esters of mono or poly glycol mono-ethers and to their production.

The alcoholysis process of preparing esters, in which an alcohol is reacted with an ester and the ester groups are interchanged, has long been known. However, in so far as known to us, this process has not previously been applied to the production of acrylic esters of glycol mono-ethers, probably because such acrylic esters polymerize very readily, and also the ether-alcohol used for the alcoholysis might be subject to cleavage in the presence of certain ester interchange catalysts.

In accord with this invention, valuable acrylic esters, which are useful as derived and more useful when polymerized, have been prepared. These esters may generally be described as the acrylic esters of glycols wherein one of the hydroxyls of the glycol is esterified with acrylic acid and the other is etherified. These esters include methoxyethyl, ethoxyethyl, butoxyethyl, phenoxyethyl, benzyloxyethyl, methoxyethoxyethyl, ethoxyethoxyethyl, butoxyethoxyethyl, phenoxyethoxyethyl and similar beta-alkoxy- and beta-aryloxyethyl and beta-alkoxyethoxy- and beta-aryloxyethoxyethyl acrylates, having in general the formula $$CH_2:CHCOO(CH_2CH_2O)_n-R,$$

where $n$ is a small integer and R is an organic radical.

The following examples are given to illustrate the invention:

EXAMPLE I

Two moles (152 g.) of beta-methoxyethanol, 6.0 moles (516 g.) of methyl acrylate, 5 g. of hydroquinone, 1 g. of copper powder and 3 g. of p-toluenesulfonic acid were mixed and refluxed in a flask attached to a fractionating column. The still was operated under total reflux until the temperature of the vapor at the still-head fell to 62°–63° C. Distillate was then slowly withdrawn, the rate being so adjusted that the temperature never exceeded 64°–65° C. The distillate consisted of the azeotrope of methanol and methyl acrylate.

When no more methanol was obtained, the excess methyl acrylate was distilled off and the remaining product was identified as beta-methoxyethyl acrylate $$(CH_2:CHCOOCH_2CH_2OCH_3),$$

a liquid boiling at 56° C. at 12 mm. pressure. It had a refractive index, $[n]_D^{20°C.}$, of 1.4272, and a density, $[d]_4^{20°C.}$, of 1.0131. The yield was 74 percent.

The acrylate thus obtained polymerized very readily when warmed with a little organic peroxide, the polymer being tough but elastic and rubberlike. It had less tack than an alkyl acrylate polymer of similar consistency and also had much better resistance to aliphatic hydrocarbons than did the latter.

Table I lists the physical properties of examples of the other glycol-ether acrylates which have been prepared by substantially the same procedure as described above.

Table 1

| Examples | B. P., °C. | Press., mm. | $n_D^{20°C.}$ | $d_4^{20°C.}$ | Yield, Percent |
|---|---|---|---|---|---|
| Beta-ethoxyethyl acrylate | 78 | 23 | 1.4278 | .9813 | 99 |
| Beta-butoxyethyl acrylate | 80 | 6 | 1.4310 | .9491 | 90 |
| Beta-2-ethylhexoxyethyl acrylate | 87 | 0.5 | 1.4408 | .9215 | 90 |
| Beta-phenoxyethyl acrylate | 103 | 0.6 | 1.5198 | 1.1035 | 84 |
| Beta-benzyloxyethyl acrylate | 107 | 0.7 | 1.5075 | 1.0741 | 68 |
| Beta-methoxyethoxyethyl acrylate | 117 | 21 | 1.4392 | 1.0421 | 61 |
| Beta-ethoxyethoxyethyl acrylate | 95 | 4.8 | 1.4401 | 1.0184 | 67 |
| Beta-butoxyethoxyethyl acrylate | 77 | 0.5 | 1.4398 | .9821 | 81 |
| Beta-2-ethylhexoxyethoxyethyl acrylate | 126 | 0.4 | 1.4510 | .9685 | |
| Beta-phenoxyethoxyethyl acrylate | 145 | 2.2 | 1.5108 | 1.1103 | 88 |

It is apparent from the foregoing examples that our process is applicable to a large variety of the ether-alcohols. Numerous variations may be introduced into the process as set forth in the example above. For instance, other catalysts might be used, such as mineral acids, aryl sulfonic acids, metal alcoholates, and so forth. Likewise, other polymerization inhibitors might be used, such as phenols, aryl amines, copper salts, sulfur, and so forth. Also, other means might be employed to remove the alcohol liberated in the reaction. Thus, instead of distilling the azeotrope of the lower alkyl acrylic ester with the liberated alcohol, other entraining agents might be added to the reaction mixture to remove the alcohol as its azeotropic mixture, suitable entraining agents being aliphatic or aromatic hydrocarbons or chlorinated hydrocarbons of suitable boiling point. Furthermore, instead of using methyl acrylate as the lower alkyl acrylic ester, other esters such as ethyl or propyl acrylate might be used. The only limitation in the latter choice is the requirement that the ester used as a reagent must have a lower boiling point than that which is to be prepared.

The acrylic esters of the glycol mono-ethers prepared in accord with this invention can be polymerized very readily by known methods such as by action of heat, light, ozone, peroxides, and so forth, and the polymerization may be carried out in mass, in aqueous emulsion or in a suitable solvent. The polymers, in general, are soft, elastic, rubbery, and notably less tacky than those prepared from alkyl acrylate monomers of comparable molecular weight. Another important advantage of the polymers of the glycol monoether acrylates over those of the alkyl acrylates is their much greater resistance to gasoline and other petroleum products. In addition to being polymerized alone, the products of this invention can be copolymerized with other polymerizable compounds of the acrylic or vinyl type to produce valuable products.

Having thus described the invention, what is claimed is:

1. An ester selected from the group consisting of beta-phenoxyethyl acrylate and beta-benzyloxyethyl acrylate.
2. Beta-phenoxyethyl acrylate.
3. Beta-benzyloxyethyl acrylate.

CHESSIE E. REHBERG.
CHARLES H. FISHER.